Dec. 15, 1931.                J. P. BAYLES                1,836,522
                      TAIL GATE FOR TRUCK BODIES
                          Filed May 16, 1929
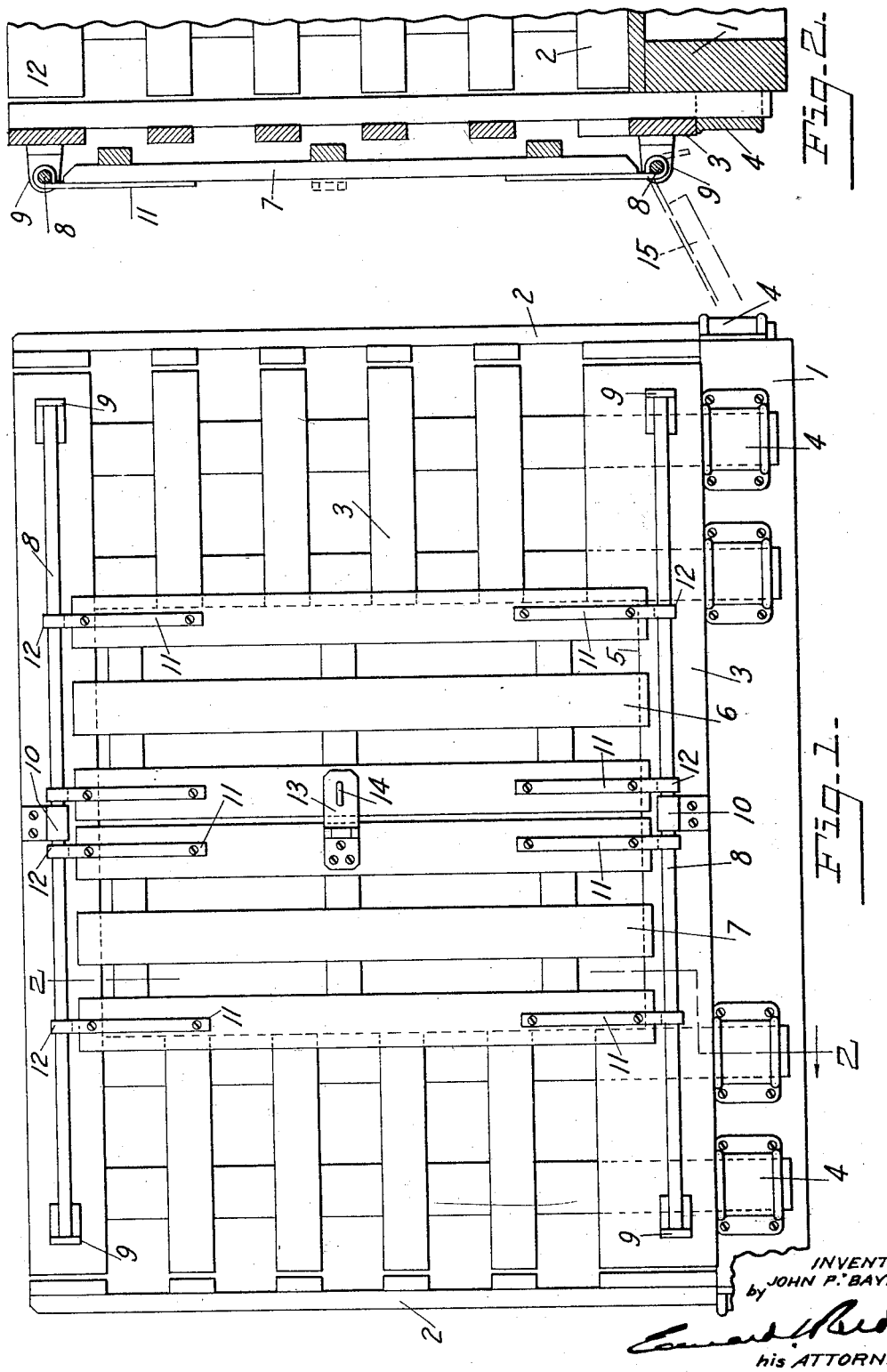
INVENTOR.
JOHN P. BAYLES.
by
his ATTORNEY.

Patented Dec. 15, 1931

1,836,522

UNITED STATES PATENT OFFICE

JOHN P. BAYLES, OF CALEDONIA, OHIO, ASSIGNOR OF ONE-HALF TO W. C. WILCOX, OF MARION, OHIO

TAIL GATE FOR TRUCK BODIES

Application filed May 16, 1929. Serial No. 363,496.

This invention relates to tail gates for truck bodies and is designed more particularly for truck bodies such as are used for transporting live stock and which are usually provided in the rear end thereof with a gate controlled opening through which the animals may enter and leave the truck body.

One object of the invention is to provide a truck body with a gate which can be opened and closed when the truck is in any position, as when it is backed up against a loading chute.

A further object of the invention is to provide a tail gate of such a character that its movement will not be obstructed or seriously interferred with by accumulations of dirt or ice or by the pressure of the animals against the end wall.

A further object of the invention is to provide a tail gate which may be easily moved into or out of its closed position but which can not be forced open by pressure from within the truck body.

A further object of the invention is to provide such a tail gate which will be simple in construction and inexpensive to build.

Other objects of the invention will appear as the device is described in detail.

In the accompanying drawings Fig. 1 is a rear end elevation of a truck body equipped with my invention; and Fig. 2 is a vertical sectional view taken on the line 2—2 of Fig. 1.

In these drawings I have illustrated one embodiment of my invention but it will be understood that this particular embodiment has been chosen for the purposes of illustration only and that the tail gate and its supporting devices may take various forms without departing from the spirit of the invention.

In that embodiment of the invention here illustrated I have shown the truck body as comprising a main frame or base 1 on which are supported side walls 2 and a rear end wall 3. The side and end walls may be of any suitable character and, as here shown, they comprise uprights having their lower ends mounted in sockets 4 on the main frame or base 1 and which are connected one to the other by horizontal bars.

The rear end wall 3 is provided with an opening or gateway 5 through which the animals may enter and leave the truck body and this opening is controlled by means of a gate. Preferably the opening in the gateway is arranged centrally of the rear end wall and when so arranged I prefer to provide the same with a double gate, which constitutes in effect two separate gates, each of which can be moved to its fully opened position without projecting beyond the side walls of the truck. The two parts of the gate are here indicated by the reference numerals 6 and 7 and are slidably mounted on the rear end wall of the truck in such a manner that the gates are supported out of contact with that end wall. For this purpose horizontal guides are arranged above and below the opening or gateway 5 and the gates are slidably mounted on these guides. Preferably each guide comprises a rod 8 mounted at its ends in brackets 9 which are rigidly secured to the rear end wall of the truck body near the lateral edges thereof and which are of such length that the guide rods will be spaced a considerable distance from the end wall. The intermediate portions of the guide rods are supported by brackets 10 which are also secured to and project rearwardly from the end wall and which are arranged centrally of the opening or gateway. Each gate is provided at its upper and lower ends with hangers 11, the outer ends of which are bent upon themselves to provide loop-shaped portions or eyes 12 which embrace the respective guide rods and serve to slidably support the gates thereon. A suitable fastening device, such as the usual hasp 13 and staple 14, serves to connect the two gates one to the other when they are in their innermost or closed positions, as shown in Fig. 1. When the two gates are so connected the central brackets 10 serve as stops to prevent the movement of the gates in either direction. The end brackets 9 constitute stops to limit the outward movement of the gates.

It will be apparent by reference to Fig. 2 that the gates are supported entirely out of contact with the end wall of the truck body. Consequently any accumulations of dirt or ice on the horizontal bars or other portions of the end wall will not interfere with the free movements of the gates. The guide rods are spaced such a distance from the end wall that there is little likelihood of dirt or ice accumulating thereon but any that does accumulate on the rods will be easily displaced by the action of the hangers and will not seriously interfere with the movement of the gates. Further, the gates being supported on the outer side of the end wall their movement will not be interfered with by pressure of the animals against the end wall, and any pressure which may be exerted against the gates themselves, by the animals, cannot release the gate or cause the same to open. The gates are freely movable when the truck is in any position, as when it is backed up close to a loading chute or a platform. Further, the lower guide rod may be utilized to support a skid on a runway, as shown at 15 in Fig. 2. The gates and their supporting structures are very simple in construction and can be built and installed at a very low cost.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

In a truck body, an end wall having an opening, guide rods arranged above and below said opening and extending beyond both sides thereof, brackets secured to said end wall to support the respective ends of said guide rods, other brackets secured to said wall substantially at the center of said opening to support the intermediate portions of said guide rods, all of said brackets extending outwardly from said wall to support said guide rods in spaced relation to said wall, a pair of gates to close said opening, hangers secured to the upper and lower ends of said gates and having loop-shaped portions to engage the respective guide rods and slidably support said gates thereon, the hangers for the respective gates engaging said guide rods on the opposite sides of said central brackets, and fastening devices to connect said gates one to the other when they are in positions to close said opening, said central brackets serving to hold the connected gates against movement on said guide rods.

In testimony whereof, I affix my signature hereto.

JOHN P. BAYLES.